United States Patent Office 3,346,395
Patented Oct. 10, 1967

3,346,395
PROCESS FOR SOFTENING THE SHELL PORTIONS
OF CRUSTACEANS FOR EDIBLE PURPOSES
Esler L. D'Aquin, 5959 Colbert St., Apt. #3,
New Orleans, La. 70124
No Drawing. Filed Oct. 7, 1965, Ser. No. 493,893
9 Claims. (Cl. 99—111)

This application is a continuation-in-part of my application Ser. No. 229,229, filed Oct. 8, 1962; now U.S. Patent No. 3,222,186.

This invention relates to a process for the in situ softening the relatively hard shell portions of common crustaceans such as crabs, crayfish, lobsters, shrimp, and the like belonging to the class Crustacea. More particularly, it provides a novel and economically feasible chemical process for treating natural hard-shell crustaceans to enhance their quality and value by converting them into relatively soft-shell crustaceans without substantially altering their physical composition, size, appearance and palatability.

The process provided herein is particularly applicable to the blue crab Callinectes sapidus Rathbun, one of the most widely consumed crustaceans that grow in size by the natural process of "molting" or "shedding." These crabs are most prevalent in the waters of the Chesapeake Bay, the South Atlantic, and the Gulf Coastal waters of the United States.

Practically all edible crustaceans are captured in the live hard-shell state. To consume them as food, they must first be cooked to render the meat palatable. The cooked crustaceans must then be hand-picked to recover the meat from the hard shells. The blue crab, however, is an exception in that a sizable proportion of the catch is converted by a segment of the fishing industry into "soft-shell" crabs, the shells of which are relatively soft to the touch, and into "paper-shell" crabs, the shells of which are somewhat less soft. Paper-shell crabs are termed "buckram" crabs in the trade. Both are well established food delicacies, and command a market price of 4 to 6 times, on an equal size basis, that obtainable for crabs in the hard-shell state. The principal reason is that soft-shell crabs have a more appealing flavor, and when fried or broiled, practically the entire crab can be eaten. In contrast, to prepare hard-shell crabs for eating, they are first boiled; and after cooling, the edible meat fragments must be hand-picked from the shell cavities, which is a tedious procedure. Further, the inedible shell or skeleton portion constitutes on an average about two-thirds or more by weight of the whole crab, and must be discarded as waste.

The methods employed by commercial fisherman for the harvesting of hard crabs, and for the production of soft crabs therefrom will not be described here but is given in detail in Commercial Fisheries Review, volume 20, No. 6, June 1958, and in Fishery Leaflet No. 358, September 1954, Fish and Wildlife Service, U.S. Department of Interior, Washington, D.C. Briefly, the catch is first classified to select only those crabs termed "peelers" which are judged by experience to be ready to shed in a period of about 1 to 15 days. These are then further segregated, and are placed in submerged wooden cages in accordance with the number of days in which they are expected to shed. They must be carefully watched around the clock by an experienced attendant and transferred periodically from cage to cage in a systematic sequence, so that new hard crabs are continuously being introduced into the system, and product soft crabs are being continually removed. The above procedure is traditional and is employed throughout the world for the production of soft crabs. As far as is known, there are no other methods or techniques that have proved successful in reducing the time and labor required; and moreover, none have proved successful for producing soft crabs from hard crabs which are not "peelers," i.e. not ready for early shedding, and none have proved successful in producing soft crabs from paper-shell crabs.

I have discovered that raw hard-shell crustaceans belonging to the class Crustacea can be converted into substantially soft-shell crustaceans by a simple and inexpensive treatment with certain acids, followed by a simple soaking or washing in water to remove the excess of the treating chemicals. I have found that the process provided by this invention produces soft-shell products of acceptable appearance and edibility, and in the case of crabs, products which are closely comparable to soft crabs produced by natural molting. Furthermore, I have observed that the process is equally capable of softening the exoskeleton and endoskeleton of hard crabs and other types of crustaceans which have been previously cooked by boiling in water, and also of thoroughly softening partially softened or "paper-shell" crabs, providing the process is carried out in close accordance with the specific conditions described herein.

Commercial adoption of the subject invention would offer a number of beneficial potentialities to the seafood industry, to the seafood consuming public, and to the cat and dog foods industry. In the case of crabs, it would alleviate the ever-present shortage of soft crabs during the normal soft crab season, and during the slack part of the season when the hard crab catch diminishes to the point where the production of soft crabs by the orthodox method becomes economically impractical. Additionally, it would force a significant reduction in the retail price of soft crabs, owing to the relatively low overall cost of carrying out the subject process. Commercial adoption of my process for conversion to the substantially softened state of the entire bodies of the common crustaceans including the heads and claws would open up a new market for crustaceans for use as seafood products and as feed for household animal pets, such as dogs and cats.

The following is included to illustrate the types of edible products that can be prepared from each of the most widely known types of crustaceans after they have been converted by my process from the hard-shell state to the relatively soft-shell state:

(a) *Softened hard-shell crabs.*—Hard-shell crabs can be converted into substantially softened crabs. The conversion can be performed directly on the raw crabs in the live state as harvested, or after they have been killed by immersing them in boiling water for a few minutes, which is referred to hereinafter as being "boiled." In either case, the products after deacidification can be cooked by frying or by broiling as is customary for cooking natural soft crabs. However, an advantage of the chemically softened crab over naturally soft crabs is that they can be more effectively seasoned by the incorporation of salt, spices, etc. in the soaking water used for the final deacidification. The chemically softened crabs may also be boiled with seasoning to yield a product, the softened state of which would facilitate hand-picking of the meat for consumption as is, or for incorporation in specialty food preparations. In addition, chemically softened crabs would be more suitable than regular hard crabs for use in "gumbos" and for "stewing." And they can also be shredded or comminuted in the converted state, or cooked by boiling in water after the conversion, for use in seafood preparations such as "crabburgers" and "stuffed crabs." Chemically softened crabs either as is or after boiling in water can also be suitably frozen or hermetically canned for use as dogfood or catfood.

(b) *Softened paper-shell crabs.*—Paper-shell crabs can be converted into substantially soft-shell crabs. These products can be cooked by frying or broiling in the same manner as natural or market soft crabs.

(c) *Softened hard-shell crayfish and lobsters.*—Crayfish and lobsters either in the raw state or after boiling as referred to in (a) above, can be converted to the substantially softened state. In either case the products after deacidification can be boiled with seasoning as is customary for cooking regular hard-shell market crayfish and lobsters. An advantage of the chemically softened products is easier hand-picking of the meat from the tails. The deacidified softened crayfish or lobsters in their whole state, i.e. including heads and claws can suitably be shredded or chopped up, seasoned, and then frozen or hermetically canned for use directly in animal food or in animal food formulations.

(d) *Softened hard-shell shrimp.*—Shrimp in their raw state as harvested, or after boiling, can be converted into substantially soft-shell shrimp. The deacidified shrimp in their whole state, i.e. including head and claws can suitably be shredded or chopped up, seasoned, and frozen or hermetically canned for use directly as animal food, or in animal food formulations. Chemically softened shrimp could also find use as human food in areas where severe protein food shortages exist, since the head of the shrimp (normally discarded) contains considerable amounts of fats, meat, vitamins, minerals, etc. which are of high nutritive value.

There is also the possibility that chemically softened shrimp could find uses under circumstances where the only shrimp that are available for harvest are too small in size for hand-picking to recover the meat. The subject process would also be applicable to the softening of krill (family Euphasids), a relatively small shrimp-like crustacean that inhabits Antarctic waters in quantities estimated in billions of tons. In connection with the highly imminent problems related to the world population explosion, scientists are already considering krill as a potentially valuable food resource and are exploring means for harvesting krill and means whereby they can be suitably prepared, deshelled, etc. for human consumption.

In carrying out the subject invention with any of the aforementioned crustaceans such as, for example, the hard-shell crab, live specimens of legal size and larger are held submerged in an excess of an aqueous solution of an organic or a mineral acid which kills them within about 10 to 30 minutes. Where the crustacean has been previously killed in boiling water, this step is, of course, omitted. They are then allowed to continue soaking in the solution for a sufficient period of time until the outer and inner shells have softened to a degree substantially equal to that of a natural soft crab as determined by the feel or touch. The soaking step is the all-important one as it is the step which accomplishes the softening of the shells. After the crabs are softened, they are removed from the acid solution or bath and are subjected to a routine sequence of agitated soakings or washes in ambient or heated tap water to remove substantially all of the residual entrained and absorbed acid. If desired, the last traces of residual acid may be effectively neutralized by employing a final soaking in a weak solution of a mild alkaline agent such as sodium carbonate. To prepare chemically softened crabs for eating, it is customary prior to cooking, to lift the ends of the large top shell with the fingers, and to remove any undigested food particles that were contained in the craw of the crab when caught. At the same time, the lungs and eyes may be removed.

It is pointed out here that in processing crustaceans by this invention, the alternate initial step of immersing the crustacean in boiling water to kill them is considered as only a routine procedure which requires no skill or invention. Another operation which is optional but which may be employed to some advantage in reducing the soaking time required is agitation of the soaking bath. And it is noted that the final step of washing out the residual acid with water is only a routine procedure which requires no skill or inventiveness. It is the step of soaking the crustacean in the acid solution which is considered the inventive step of my process.

A large number of bench-scale experiments were carried out to determine optimum processing conditions for the conversion to the soft-shell state of the following: raw and boiled hard-shell crabs; raw paper-shell crabs; raw and boiled hard-shell crayfish; raw and boiled hard-shell lobsters; raw and boiled hard-shell shrimp. Acids employed were reagent grades of glacial acetic acid, hydrochloric acid, lactic, orthophosphoric, and citric acids. Ranges of the other important variables were: acid concentration in the soaking or treating bath, about .16 to 50% by weight; bath temperature, about 40 to 212 degrees Fahrenheit. Criteria employed for establishing optimum levels for each of the process variables and combinations of same were: degree of shell softening; treatment time required; firmness of the meat; degree of retention of original appearance and color; flavor after cooking. The experiments were designed to also establish conditions that would fall into the most practical range, i.e. conditions of least severity, minimum complexity, and lowest investment and operating expense, consistent with acceptable product quality.

In the processing of the various types of crustaceans, it has been observed that the degree of shell softening attained depends principally upon the particular acid employed, its concentration in the treating bath, the temperature of the bath, and the time duration of the treatment. Further it has been found that the rate and degree of shell softening can be increased by increasing the concentration of acid in the treating bath; and that the rate and degree of shell softening can be increased by increasing the temperature of the treating bath.

As was explained in my original application, Ser. No. 229,229, discoloration of the outer shells of raw hard crabs which occurs when my process is practiced at higher concentrations and/or at higher temperatures than the limits set forth in my original application for the prevention of shell discoloration, practically precludes market acceptance of the chemically softened crabs in direct competition with natural soft crabs. However, it is pointed out that discoloration of the shells does not adversely affect their use as animal food. For this reason my process is also applicable advantageously to the production of softened hard-shell crabs even though the shells may be discolored. Accordingly, the necessary supporting data along with the preferred processing conditions for operation of my process for the softening of raw and boiled hard crabs regardless of shell discoloration is given under Examples 1 and 2.

In the practice of my invention for the conversion of raw paper-shell crabs to the soft state, it has been found that objectionable discoloration of the shells will also develop as it does with raw hard-shell crabs unless the operating conditions of temperature and acid concentration are carefully selected. As with softened raw hard crabs, discoloration of the shells of softened paper-shell crabs likewise seriously limits their market acceptance and salability in direct competition with natural soft crabs. Accordingly, it was necessary to establish the specific conditions of temperature and acid concentration for the chemical softening of raw paper-shell crabs without causing any discoloration of the shells. These data are set forth in Examples 3 and 4.

It must be noted in the processing of any one of the various types of crustaceans by this invention under any one set of processing conditions as to the particular acid employed, the acid concentration, and the temperature of the treating bath, the crustaceans may vary considerably from one individual to another in the time required for the development of the same degree of shell softness as determined by tactile examination. The reasons for this, while not known, may be that some shellfish have thicker shells than others, or that the shells may vary in chemical composition, depending upon their age and size, time of the year when harvested, and possibly the mineral composition of the water in which they lived.

It is noted here that each of the 8 examples that follow relates to a particular type of crustacean being processed with a particular acid. However, to avoid needless repetition under each of the examples, the following additional information and data are given which are common to the processing of all of the types of crustaceans covered in this application: (1) With the exception of paper-shell crabs (Examples 3, 4), equivalent softening results are obtained whether the crustaceans are acid-treated in the live raw state or after they have been killed by submergence in boiling water; (2) Soaking periods in excess of 35 hours are considered as not being in a practical range and are not preferred or recommended; (3) Concentrations of acetic acid in excess of about 25% are not preferred or recommended as lacking practicality, and concentrations of hydrogen chloride in excess of about 16% are likewise not recommended or preferred as lacking practicality; (4) As has been mentioned previously, crustaceans of any one type vary considerably from individual to individual as to the time required for the development of the same degree of shell softness. Because of this, in order to facilitate interpretation of the data set forth in the examples, all figures or values given in the tables for the soaking period are average values representing a large number of individuals; (5) In each of the examples, data are given to show that when the subject crustacean is processed with the subject acid, an acceptably softened product is obtained in an elapsed soaking time of not more than 35 hours, and that the elapsed soaking time depends upon the temperature used in the soaking bath and upon the acid concentration used in the soaking bath. It is important to note that in all of the examples, it was deemed unnecessary to include data to substantiate operation of the process at temperatures intermediate to those given. For instance, in Example 1, data are given for operation at 4 selected and practical temperature levels, i.e. 40, 80, 145 and 212 degrees Fahrenheit. No data for intermediate temperatures is given, as it is obvious from the results that my process for softening hard crabs can be operated successfully, and within 35 hours, at any temperature between 40 and 212 degrees Fahrenheit, depending upon the acid concentration employed. Similarly, data are given for operation at 5 selected acid concentrations, i.e. 2, 5, 10, 25, and 50% by weight, and for the same reason, data are not included for operation at any intermediate concentrations, it being obvious that my process for softening hard crabs can be carried out successfully, and within 35 hours, at any acid concentration between 2 and 50%, depending upon the soaking temperature employed.

For each of the types of crustaceans, temperatures higher than 212 degrees Fahrenheit were also tried. These experiments were carried out in an autoclave at about 10 p.s.i. gage pressure, equivalent to a temperature of about 241 degrees Fahrenheit. As would be obvious and expected, the results showed a further reduction in soaking time required, but are not included or preferred as lacking practicality.

Organic acids other than glacial acetic acid were evaluated for their effectiveness and all-around suitability for the softening of crustaceans. For each of these acids, the same pattern of experiments was carried out as employed in Example 1. The acids evaluated were reagent grades of orthophosphoric acid (85%), lactic (85%), and citric (90%). The results showed that these acids were either incapable of softening the shells of the crustaceans to an acceptable degree, or they caused the meat of the crustaceans to become soft and mushy, and all caused objectionable discoloration of the shells of paper-shell crabs before they could become acceptably softened. Hence, none of the above acids would be considered suitable. Of the mineral acids tried, hydrochloric acid was the most suitable.

The following 8 examples and tables are presented to illustrate in essential detail the important features involved in the practice of the subject invention for softening the shells of crustaceans. However, as it is obvious that numerous variations can be made in the practice of the subject invention, the scope of the invention is defined by the claims, and is not to be construed as being limited to any particular type of crustacean, and to the specific processing conditions disclosed herein.

EXAMPLE 1

*Treatment of hard crabs with aqueous acetic acid*
*(Table 1)*

Raw and boiled hard-shell crabs of medium and large sizes were subjected to a series of 16 separate soaking experiments in which the acid concentration in the soaking bath and the temperature of the soaking bath were varied within the limits shown in Table 1. The acid employed was reagent grade glacial acetic acid assaying about 99–100% acetic acid by weight. Acid concentrations used in the soaking bath were 2, 5, 10, 25, and 50% by weight. Bath temperatures employed were 40, 80, 145 and 212 degrees Fahrenheit. Temperatures were thermostatically controlled.

In each experiment, the crabs were held submerged in the bath until the shells of the crabs were judged by tactile examination to be acceptably soft. At this point the elapsed treatment time was recorded. Exp. 1 was discontinued after 35 hours as the crabs showed little or no signs of shell softness, obviously because of the low bath temperature employed.

TABLE 1.—TREATMENT OF HARD CRABS WITH AQUEOUS ACETIC ACID

| Exper. No. | Soaking Temp., Degrees F. | Acid Concentration, Weight Percent [1] | Soaking Period |
| --- | --- | --- | --- |
| 1 | 40 | 25 | >35 Hrs. |
| 2 | 80 | 2 | 35 Hrs. |
| 3 | 80 | 5 | 23 Hrs. |
| 4 | 80 | 10 | 20 Hrs. |
| 5 | 80 | 25 | 20 Hrs. |
| 6 | 80 | 50 | 19 Hrs. |
| 7 | 145 | 2 | 30 Hrs. |
| 8 | 145 | 5 | 22 Hrs. |
| 9 | 145 | 10 | 21 Hrs. |
| 10 | 145 | 25 | 20 Hrs. |
| 11 | 145 | 50 | 18 Hrs. |
| 12 | 212 | 2 | 110 Mins. |
| 13 | 212 | 5 | 100 Mins. |
| 14 | 212 | 10 | 90 Mins. |
| 15 | 212 | 25 | 80 Mins. |
| 16 | 212 | 50 | 70 Mins. |

[1] Percentage by weight of glacial acetic acid in soaking bath.

The experiments show that at any of the 4 soaking temperatures employed, the effect of increased acid concentration in the soaking bath is to reduce the soaking time required to achieve acceptable shell softness; and that for any of the 5 acid concentrations employed, the effect of increased temperature is also to reduce the soaking time required to achieve acceptable shell softening.

For the softening of raw or boiled hard-shell crabs by my process when using acetic acid, and when using a soaking temperature of about from 80 to 145 degrees Fahrenheit, I prefer to use an acid concentration of about from 2% to 25% by weight, and a soaking time of about from 35 hours to 20 hours; and when using a soaking bath temperature of about from 145 to 212 degrees Fahrenheit, I prefer to use an acid concentration of about from 2% to 257 by weight, and a soaking time of about from 30 hours to 80 minutes, the longer soaking times being required for the lower acid concentrations and the lower temperatures.

EXAMPLE 2

*Treatment of hard crabs with aqueous hydrochloric acid (Table 2)*

Raw and boiled hard-shell crabs of medium and large sizes were subjected to a series of 16 separate soaking experiments in which the acid concentration in the soaking bath, and the temperature of the soaking bath were varied within the limits shown in Table 2. The acid employed was reagent grade 20 degree Baumé hydrochloric acid assaying about 31.4% of dissolved hydrogen chloride by weight. Acid concentrations used were 2, 5, 10, 25, and 50% by weight of 20 degree Baumé acid, which are equivalent to about from 0.6% to 15.9% by weight of dissolved hydrogen chloride. Bath temperatures employed were 40, 80, 145, and 212 degrees Fahrenheit. Bath temperatures were thermostatically controlled.

TABLE 2.—TREATMENT OF HARD CRABS WITH AQUEOUS HYDROCHLORIC ACID

| Exper. No. | Soaking Temp., Degrees F. | Acid Concentration, Weight Percent | | Soaking Period |
|---|---|---|---|---|
| | | 20 Bé. Acid | Hydrogen Chloride [1] | |
| 1 | 40 | 2 | 0.63 | >35 Hrs. |
| 2 | 40 | 5 | 1.57 | 25 Hrs. |
| 3 | 40 | 10 | 3.14 | 20 Hrs. |
| 4 | 80 | 2 | 0.63 | 35 Hrs. |
| 5 | 80 | 5 | 1.57 | 25 Hrs. |
| 6 | 80 | 10 | 3.14 | 19 Hrs. |
| 7 | 80 | 25 | 7.85 | 18 Hrs. |
| 8 | 145 | 2 | 0.63 | 20 Hrs. |
| 9 | 145 | 5 | 1.57 | 6 Hrs. |
| 10 | 145 | 10 | 3.14 | 3 Hrs. |
| 11 | 145 | 25 | 7.85 | 2 Hrs. |
| 12 | 212 | 2 | 0.63 | 2.5 Hrs. |
| 13 | 212 | 5 | 1.57 | 90 Mins. |
| 14 | 212 | 10 | 3.14 | 30 Mins. |
| 15 | 212 | 25 | 7.85 | 20 Mins. |
| 16 | 212 | 50 | 15.70 | 6 Mins. |

[1] Equivalent percentage by weight of hydrogen chloride in soaking bath.

In each experiment the hard crabs were held submerged in the bath until the shells of the crabs were judged by tactile examination to be acceptably soft. At this point, the elapsed treatment time was recorded. Exp. 1 was discontinued after 35 hours as the crabs were not acceptably soft due obviously to the low bath temperature and the low acid concentration employed.

The experiments show as in Example 1, that at any of the 4 soaking temperatures employed, the effect of increased acid concentration is to reduce the soaking time required to achieve acceptable shell softening; and that for any of the acid concentrations employed, the effect of increased soaking temperature is also to reduce the soaking time required to achieve acceptable softening.

For the softening of raw or boiled hard-shell crabs by my process with hydrochloric acid when using a soaking bath temperature of about from 80 to 145 degrees F., I prefer to use an acid concentration of about from 0.6% to 7.9% of hydrogen chloride by weight, and a soaking time of about from 35 hours to 2 hours; and when using a soaking bath temperature of about from 145 to 212 degrees F., I prefer to use an acid concentration of about from 0.6% to 7.9% of hydrogen chloride by weight, and a soaking time of about from 20 hours to 20 minutes; the longer times being required for the lower acid concentrations and the lower temperatures.

EXAMPLE 3

*Treatment of paper-shell crabs with aqueous acetic acid (Table 3)*

Raw paper-shell crabs of medium and large sizes were subjected to a series of 16 separate soaking treatments in which the acid concentration in the soaking bath and the temperature of the soaking bath were varied within the limits shown in Table 3. The acid employed was reagent grade glacial acetic acid assaying about 99–100% acetic acid by weight. Acid concentrations used in the soaking bath were 2, 3, 5, 10, 25%, and 50% by weight. Bath temperatures employed were 40, 80, and 120 degrees F. Temperatures were thermostatically controlled.

TABLE 3.—TREATMENT OF PAPER-SHELL CRABS WITH AQUEOUS ACETIC ACID

| Exper. No. | Soaking Temp., Degrees F. | Acid conc.,[1] Weight Percent | Soaking period, Hrs. | Properties of Softened Crabs | |
|---|---|---|---|---|---|
| | | | | Acceptable Shell Softness | Shell Discoloration |
| 1 | 40 | 1–2 | >35 | No | No. |
| 2 | 40 | 3 | 15 | Yes | No. |
| 3 | 40 | 5 | 9 | Yes | No. |
| 4 | 40 | 10 | 4.5 | Yes | No. |
| 5 | 40 | 25 | 2.5 | Yes | No. |
| 6 | 40 | 50 | 1.5 | Yes | Yes. |
| 7 | 80 | 2 | 26 | Yes | Yes. |
| 8 | 80 | 3 | 9 | Yes | No. |
| 9 | 80 | 5 | 4 | Yes | No. |
| 10 | 80 | 10 | 2.5 | Yes | No. |
| 11 | 80 | 25 | 1.5 | Yes | Yes. |
| 12 | 80 | 50 | 1.5 | Yes | Yes. |
| 13 | 120 | 2 | 4.5 | Yes | No. |
| 14 | 120 | 3 | 2.5 | Yes | No. |
| 15 | 120 | 5 | 1.0 | Yes | No. |
| 16 | 120 | 10 | 1.0 | Yes | Yes. |

[1] Percentage by weight of glacial acetic acid in soaking bath.

In each experiment the crabs were held submerged in the bath until the shells of the crabs were judged by tactile examination to be equally as soft as the shells of natural soft-shell crabs. At this point, the elapsed treatment time was recorded, and the crabs were closely examined to detect whether the outer shells showed any objectionable discoloration.

The experiments show as in the previous examples that the effect of increased temperature and also of increased acid concentration in the soaking bath is to reduce the soaking time required to achieve acceptable shell softness.

For the softening of raw paper-shell crabs by my process without causing shell discoloration when using acetic acid and when using a soaking temperature of about 40 degrees F., I prefer to use an acid concentration of about from 3 to 25% by weight, and a soaking time of about from 15 hours to 2.5 hours; and when using a soaking temperature of about 80 degrees F., I prefer to use an acid concentration of about from 3 to 10% by weight, and a soaking time of about from 9 hours to 2.5 hours; and when using a soaking temperature of about 120 degrees F., I prefer to use an acid concentration of about from 2 to 5% by weight, and a soaking time of about from 4.5 hours to 1 hour; the longer times being required for the lower acid concentrations and the lower temperatures.

EXAMPLE 4

*Treatment of paper-shell crabs with aqueous hydrochloric acid (Table 4)*

Raw paper-shell crabs of medium and large sizes were subjected to a series of 7 soaking treatments in which the acid concentration in the soaking bath and the temperatures of the soaking bath were varied within the limits shown in Table 4. The acid employed was 20 degree Baumé reagent grade hydrochloric acid assaying about 31.4% of dissolved hydrogen chloride by weight. Acid concentrations used were 1, 3, 5, 10, and 25% by weight of 20 degree Baumé hydrochloric acid by weight which are equivalent to about from 0.3 to 8.0% by weight of dissolved hydrogen chloride. Bath temperatures employed were 40 and 80 degrees F. Temperatures were thermostatically controlled.

TABLE 4.—TREATMENT OF PAPER-SHELL CRABS WITH AQUEOUS HYDROCHLORIC ACID

| Exper. No. | Soaking Temp., Degrees F. | Acid Conc., Weight Percent | | Soaking Period | Properties of Softened Crabs | |
|---|---|---|---|---|---|---|
| | | 20 Bé. | (¹) | | Acceptable Shell Softness | Shell Discoloration |
| 1 | 40 | 1 | 0.31 | 6 Hrs | Yes | No. |
| 2 | 40 | 3 | 0.94 | 2.5 Hrs | Yes | No. |
| 3 | 40 | 5 | 1.57 | 1.5 Hrs | Yes | No. |
| 4 | 40 | 10 | 3.14 | 1.0 Hrs | Yes | No. |
| 5 | 40 | 25 | 7.85 | 30 Mins | Yes | Yes. |
| 6 | 30 | 3 | 0.94 | 45 Mins | Yes | No. |
| 7 | 80 | 5 | 1.57 | 30 Mins | Yes | No. |

¹ Percentage by weight of hydrogen chloride in soaking bath.

In each experiment the crabs were held submerged in the bath until the shells of the crabs were judged by tactile examination to be equally as soft as the shells of natural soft-shell crabs. At this point, the elapsed time of treatment was recorded and the crabs were closely examined to detect whether the outer shells showed any objectionable discoloration. In Exps. 5 and 7, the product crabs were acceptably soft but the shells were discolored.

The experiments show as in all of the above examples, that the effect of increased acid concentration and also of increased soaking temperature is to reduce the soaking time required to achieve acceptable shell softness.

For the treatment of raw paper-shell crabs by my process to achieve acceptable shell softness without objectionable shell discoloration when using hydrochloric acid and when using a soaking bath temperature of about 40 degrees F., I prefer to use an acid concentration of about 0.3 to 3.2% by weight of hydrogen chloride, and a soaking time of about from 6 hours to 1 hour; and when using a bath temperature of about 80 degrees F., I prefer to use an acid concentration of about 0.9 by weight of hydrogen chloride, and a soaking time of about 45 minutes; the longer times being required for the lower acid concentrations and the lower temperatures.

EXAMPLE 5

*Treatment of crayfish with aqueous acetic acid (Table 5)*

Raw and boiled hard-shell crayfish of medium and large sizes were subjected to a series of 11 separate soaking treatments in which the acid concentration in the soaking bath and the temperature of the soaking bath were varied within the limits shown in Table 5. The acid employed was reagent grade acetic acid assaying about 99–100% acid by weight. Acid concentrations used in the soaking bath were 2, 5, 10, and 25% by weight. Bath temperatures employed were 80, 145, and 212 degrees F. Temperatures were thermostatically controlled.

TABLE 5.—TREATMENT OF CRAYFISH WITH AQUEOUS ACETIC ACID

| Exper. No. | Soaking Temp., Degrees F. | Acid Concentration, Weight Percent ¹ | Soaking Period |
|---|---|---|---|
| 1 | 80 | 5 | >35 Hrs. |
| 2 | 80 | 10 | 32 Hrs. |
| 3 | 80 | 25 | 24 Hrs. |
| 4 | 145 | 2 | 18 Hrs. |
| 5 | 145 | 5 | 6 Hrs. |
| 6 | 145 | 10 | 3 Hrs. |
| 7 | 145 | 25 | 100 Mins. |
| 8 | 212 | 2 | 30 Mins. |
| 9 | 212 | 5 | 30 Mins. |
| 10 | 212 | 10 | 25 Mins. |
| 11 | 212 | 25 | 20 Mins. |

¹ Percentage by weight of glacial acetic acid in soaking bath.

In each experiment, the crayfish were held submerged in the bath until the shells of the crayfish were judged by tactile examination to be acceptably soft. At this point, the elapsed treatment time was recorded. Exp. 1 was discontinued after 35 hours as the shells of the crayfish were not acceptably soft.

The experiments show as in all of the previous examples, that the effect of increased acid concentration and also of increased soaking bath temperature is to reduce the soaking time required to achieve acceptable shell softness.

For the softening of raw or boiled hard-shell crayfish by my process when using acetic acid, and when employing a soaking bath temperature of about from 145 to 212 degrees F., I prefer to use an acid concentration of about from 2 to 25% by weight and a soaking time of about from 18 hours to 20 minutes; the longer times being required for the lower acid concentrations and the lower temperatures.

EXAMPLE 6

*Treatment of crayfish with aqueous hydrochloric acid (Table 6)*

Raw and boiled hard-shell crayfish of medium and large sizes were subjected to a series of 11 separate soaking treatments in which the acid concentration of the soaking bath and the temperature of the soaking bath were varied within the limits shown in Table 6. The acid employed was reagent grade 20 Baumé hydrochloric acid assaying about 31.4% of dissolved hydrogen chloride by weight. Acid concentrations used in the soaking bath were about 2 to 25% by weight of 20 Baumé acid which are equivalent to about from 0.6 to 8.0% of dissolved hydrogen chloride by weight. Bath temperatures employed were 80, 145, and 212 degrees F. Bath temperatures were thermostatically controlled.

TABLE 6.—TREATMENT OF CRAYFISH WITH AQUEOUS HYDROCHLORIC ACID

| Exper. No. | Soaking Temp., Degrees F. | Acid Concentration, Weight Percent | | Soaking Period |
|---|---|---|---|---|
| | | 20 Bé. Acid | Hydrogen Chloride ¹ | |
| 1 | 80 | 5 | 1.57 | >35 Hrs. |
| 2 | 80 | 10 | 3.14 | 30 Hrs. |
| 3 | 80 | 25 | 7.85 | 24 Hrs. |
| 4 | 145 | 2 | 0.63 | 26 Hrs. |
| 5 | 145 | 5 | 1.57 | 7 Hrs. |
| 6 | 145 | 10 | 3.14 | 2.5 Hrs. |
| 7 | 145 | 25 | 7.85 | 100 Mins. |
| 8 | 212 | 2 | 0.63 | 110 Mins. |
| 9 | 212 | 5 | 1.57 | 75 Mins. |
| 10 | 212 | 10 | 3.14 | 45 Mins. |
| 11 | 212 | 25 | 7.85 | 15 Mins. |

¹ Equivalent percentage by weight of hydrogen chloride in soaking bath.

In each experiment, the crayfish were held submerged in the bath until the shells of the crayfish were judged by tactile examination to be acceptably soft. At this point, the elapsed time was recorded. Exp. 1 was discontinued after 35 hours as the shells of the crayfish were not acceptably soft.

The experiments show as in all of the previous examples that the effect of increased acid concentration and also of increased temperature in the soaking bath is to reduce the soaking time required to achieve acceptable softness of the shells.

For the softening of raw or boiled hard-shell crayfish by my process with hydrochloric acid, when using a soaking bath temperature of about from 145 to 212 degrees F., I prefer to use an acid concentration of about from 0.6% to 7.9% by weight of hydrogen chloride, and a soaking time of about from 26 hours to 15 minutes; the longer times being required for the lower acid concentrations and the lower temperatures.

EXAMPLE 7

*Treatment of lobsters with aqueous hydrochloric acid (Table 7)*

Raw or boiled hard-shell lobsters of medium and large sizes were subjected to a series of 9 separate soaking treatments in which the acid concentration in the soaking bath and the temperature of the soaking bath were varied within the limits shown in Table 7. The acid employed was reagent grade 20 Baumé hydrochloric acid assaying about 31.4% of dissolved hydrogen chloride by weight. Acid concentrations employed in the soaking bath were about 2, 5, 10, and 25% by weight of 20 Baumé acid which are equivalent to about from 0.6 to 8.0% by weight of hydrogen chloride. Bath temperatures employed were 80, 145 and 212 degrees F. Bath temperatures were thermostatically controlled.

TABLE 7.—TREATMENT OF LOBSTERS WITH HYDROCHLORIC ACID (AQUEOUS)

| Exper. No. | Soaking Temp., Degrees F. | Acid Concentration, Weight Percent | | Soaking Period |
|---|---|---|---|---|
| | | 20 Bé. Acid | Hydrogen Chloride [1] | |
| 1 | 80 | 25 | 7.85 | >35 Hrs. |
| 2 | 145 | 2 | 0.63 | 24 Hrs. |
| 3 | 145 | 5 | 1.57 | 6 Hrs. |
| 4 | 145 | 10 | 3.14 | 2 Hrs. |
| 5 | 145 | 25 | 7.85 | 80 Mins. |
| 6 | 212 | 2 | 0.63 | 80 Mins. |
| 7 | 212 | 5 | 1.57 | 60 Mins. |
| 8 | 212 | 10 | 3.14 | 20 Mins. |
| 9 | 212 | 25 | 7.85 | 10 Mins. |

[1] Equivalent percentage by weight of hydrogen chloride in soaking bath.

In each experiment, the lobsters were held submerged in the soaking bath until the shells of the lobsters were judged by tactile examination to be acceptably soft. Exp. 1 was discontinued after 35 hours as the lobsters were not acceptably soft.

The experiments show as in all of the previous examples, that the effect of increased acid concentration and also of increased temperature is to reduce the soaking time required to achieve acceptable shell softness.

For the softening of raw or boiled hard-shell lobsters by my process when using aqueous hydrochloric acid and when using a soaking temperature of about from 145 to 212 degrees F., I prefer to use an acid concentration of about from 0.6% to 7.9% by weight of hydrogen chloride, and a soaking time of about from 24 hours to 10 minutes; the longer times being required for the lower acid concentrations and the lower temperatures.

EXAMPLE 8

*Treatment of shrimp with aqueous hydrochloric acid (Table 8)*

Raw or boiled hard-shell shrimp of medium and large sizes were subjected to a series of 21 separate soaking treatments in which the acid concentration in the soaking bath and the temperature of the soaking bath were varied within the limits shown in Table 8. The acid employed was reagent grade 20 degree Baumé hydrochloric acid assaying about 31.4% hydrogen chloride by weight. Acid concentrations employed in the soaking bath were 0.5, 1, 2, 5, 10, 25, and 50% by weight of 20 Baumé acid, which are equivalent to about from 0.16% to 15.9% by weight of hydrogen chloride. Bath temperatures employed were 80, 145 and 212 degrees F. Bath temperatures were thermostatically controlled.

TABLE 8.—TREATMENT OF SHRIMP WITH AQUEOUS HYDROCHLORIC ACID

| Exper. No. | Soaking Temp., Degrees F. | Acid Concentration, Weight Percent | | Soaking Period |
|---|---|---|---|---|
| | | 20 Bé. Acid | Hydrogen Chloride [1] | |
| 1 | 80 | 0.5 | 0.16 | >35 Hrs. |
| 2 | 80 | 1 | 0.32 | 30 Hrs. |
| 3 | 80 | 2 | 0.63 | 28 Hrs. |
| 4 | 80 | 5 | 1.57 | 26 Hrs. |
| 5 | 80 | 10 | 3.14 | 22 Hrs. |
| 6 | 80 | 25 | 7.85 | 18 Hrs. |
| 7 | 80 | 50 | 15.70 | 12 Hrs. |
| 8 | 145 | 0.5 | 0.16 | 14 Hrs. |
| 9 | 145 | 1 | 0.32 | 10 Hrs. |
| 10 | 145 | 2 | 0.63 | 7 Hrs. |
| 11 | 145 | 5 | 1.57 | 5 Hrs. |
| 12 | 145 | 10 | 3.14 | 80 Mins. |
| 13 | 145 | 25 | 7.85 | 40 Mins. |
| 14 | 145 | 50 | 15.70 | 20 Mins. |
| 15 | 212 | 0.5 | 0.16 | 90 Mins. |
| 16 | 212 | 1 | 0.32 | 35 Mins. |
| 17 | 212 | 2 | 0.63 | 30 Mins. |
| 18 | 212 | 5 | 1.57 | 25 Mins. |
| 19 | 212 | 10 | 3.14 | 15 Mins. |
| 20 | 212 | 25 | 7.95 | 10 Mins. |
| 21 | 212 | 50 | 15.70 | 5 Mins. |

[1] Equivalent percentage of hydrogen chloride by weight in soaking bath.

In each experiment, the shrimp were held submerged in the soaking bath until the shells of the shrimp were judged by tactile examination to be acceptably soft.

The experiments show as in all of the previous examples, that the effect of increased acid concentration and also of increased temperature in the soaking bath is to reduce the soaking time required to achieve acceptable shell softness.

For the softening of raw or boiled shrimp by my process when using hydrochloric acid, and when using a soaking bath temperature of about from 80 to 145 degrees F., I prefer to use an acid concentration of about from 0.30 to 7.9% of hydrogen chloride by weight, and a soaking time of about from 30 hours to 40 minutes; and when using a soaking temperature of about from 145 to 212 degrees F., I prefer to use an acid concentration of about from 0.30% to 7.9% by weight of hydrogen chloride, and a soaking time of about from 10 hours to 10 minutes; the longer times being required for the lower acid concentration and the lower temperatures.

It is apparent from the foregoing specifications and examples that considerable latitude exists in the practice of the subject invention for softening the shells of crustaceans. Not only can a wide variety of crustaceans be successfully processed, but either acetic acid or hydrochloric acid can be employed. Also, the operator can exercise his choice of acid concentration and soaking temperature within relatively wide limits, and can accomplish acceptable shell softening within a wide range for the soaking period of up to 35 hours.

It must be pointed out that the soaking time required to achieve acceptable shell softness is actually a result, and that it can be varied by the operator to suit his purpose by varying the acid concentration and/or the temperature. Thus, an operator may for economic reason such as to obviate the need of expensive corrosive-resistant equipment, may prefer to employ a weaker acid concentration and/or a lower temperature. Such processing conditions would, of course, require a longer soaking period. Or he may prefer to use a weaker acid concentration for other reasons such as to reduce the loss of acid in the final washing operation. On the other hand, he may choose to employ a high acid concentration and/or a high temperature in order to reduce the soaking period for the purpose of increasing the throughput capacity of his equipment. Whatever his decision, the data contained in the tables will serve as a helpful guide for carrying out his objective.

It must be further noted that for any particular type of crustacean, and the particular acid employed, the soak time required to achieve acceptable shell softness, aside from depending upon temperature and concentration, may also vary considerably from one specimen of the crustacean to the next. It must also be realized that there may exist some differences between any two operators in judging what "acceptable softness" precisely is, since the degree of shell softness of crustaceans can only be determined subjectively, that is, by tactile examination or fuel, there being no other method or means known in the industry for measuring degree of shell softness. In the case of the blue crab, however, a fairly good comparison can be made between a chemically softened crab as produced by my process, and a natural soft crab, although even natural soft crabs will vary somewhat in degree of softness as determined by tactile examination.

As it is apparent from the foregoing that the soaking time required to achieve acceptable shell softness is dependent upon a number of variable factors, it may be stated that my process can be effectively carried out by using the data in the tables as a guide, and simply soaking the crustaceans in the acid bath for a sufficient period of time until the shells become acceptably soft as determined by tactile examination. This should offer no difficulty to anyone skilled in the art.

I claim:

1. A process for softening the shells of hard-shell crabs for edible purposes comprising soaking the crabs at temperatures from above 80 to 212 degrees Fahrenheit, in an aqueous solution containing from about 2% to 25% by weight of glacial acetic acid, until the shells become acceptably soft as determined by tactile examination.

2. A process for softening the shells of hard-shell crabs for edible purposes comprising soaking the crabs at temperatures of from about 80 to 212 degrees Fahrenheit, in an aqueous solution containing from about 0.6% to 7.9% by weight of hydrogen chloride, until the shells become acceptably soft as determined by tactile examination.

3. A process for softening the shells of paper-shell crabs for edible purposes without causing objectionable shell discoloration, comprising soaking the crabs at a temperature of about 120 degrees Fahrenheit, in an aqueous solution containing from about 2% to 5% by weight of glacial acetic acid, until the shells become acceptably soft as determined by tactile examination.

4. A process for softening the shells of paper-shell crabs for edible purposes without causing objectionable shell discoloration, comprising soaking the crabs at a temperature of about 40 degrees Fahrenheit, in an aqueous solution containing from about 0.3% to 3.2% by weight of hydrogen chloride, until the shells become acceptably soft as determined by tactile examination.

5. A process for softening the shells of paper-shell crabs for edible purposes without causing objectionable shell discoloration, comprising soaking the crabs at a temperature of about 80 degrees Fahrenheit, in an aqueous solution containing about 0.9% by weight of hydrogen chloride, until the shells become acceptably soft as determined by tactile examination.

6. A process for softening the shells of hard-shell crayfish for edible purposes comprising soaking the crayfish at temperatures of from about 145 to 212 degrees Fahrenheit, in an aqueous solution containing from about 2% to 25% by weight of glacial acetic acid, until the shells become acceptably soft as determined by tactile examination.

7. A process for softening the shells of hard-shell crayfish for edible purposes comprising soaking the crayfish at temperatures of from about 145 to 212 degrees Fahrenheit, in an aqueous solution containing from about 0.6% to 7.9% by weight of hydrogen chloride, until the shells become acceptably soft as determined by tactile examination.

8. A process for softening the shells of hard-shell lobsters for edible purposes comprising soaking the lobsters at temperatures of from about 145 to 212 degrees Fahrenheit, in an aqueous solution containing from about 0.6% to 7.9% by weight of hydrogen chloride, until the shells become acceptably soft as determined by tactile examination.

9. A process for softening the shells of hard-shell shrimp for edible purposes comprising soaking the shrimp at temperatures of from about 145 to 212 degrees Fahrenheit, in an aqueous solution containing from about 0.16% to 7.9% by weight of hydrogen chloride, until the shells become acceptably soft as determined by tactile examination.

References Cited

UNITED STATES PATENTS

| | | |
|---|---|---|
| 2,041,727 | 5/1936 | Prytherch. |
| 2,554,625 | 5/1951 | McFee et al. |
| 2,669,520 | 2/1954 | Fellers _____ 99—111 X |
| 3,222,186 | 12/1965 | D'Aquin _____ 99—111 |

OTHER REFERENCES

Pigman (1): "Chemistry of the Carbohydrates," 1948, published by Academic Press Inc.., New York City, N,Y., p. 415, article entitled Preparation and Synthesis of Amino Sugars.

Pigman (2): "The Carbohydrates," 1957, published by Academic Press Inc., New York City, N.Y., p. 715, article entitled Chitin.

HYMAN LORD, *Primary Examiner.*

A. LOUIS MONACELL, *Examiner.*